US011387909B2

(12) United States Patent
Kazama et al.

(10) Patent No.: US 11,387,909 B2
(45) Date of Patent: Jul. 12, 2022

(54) OPTICAL SIGNAL TRANSMITTER

(71) Applicant: Nippon Telegraph and Telephone Corporation, Tokyo (JP)

(72) Inventors: Takushi Kazama, Musashino (JP); Takeshi Umeki, Musashino (JP); Takahiro Kashiwazaki, Musashino (JP); Koji Embutsu, Musashino (JP); Osamu Tadanaga, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 132 days.

(21) Appl. No.: 16/980,330

(22) PCT Filed: Mar. 7, 2019

(86) PCT No.: PCT/JP2019/009052
§ 371 (c)(1),
(2) Date: Sep. 11, 2020

(87) PCT Pub. No.: WO2019/176714
PCT Pub. Date: Sep. 19, 2019

(65) Prior Publication Data
US 2021/0044358 A1    Feb. 11, 2021

(30) Foreign Application Priority Data

Mar. 14, 2018   (JP) .............................. JP2018-046599

(51) Int. Cl.
*H04B 10/532*    (2013.01)
*G02F 1/35*    (2006.01)
(Continued)

(52) U.S. Cl.
CPC ......... *H04B 10/532* (2013.01); *G02F 1/3501* (2013.01); *G02F 1/377* (2013.01);
(Continued)

(58) Field of Classification Search
CPC ..... H04B 10/532; G02F 1/3501; G02F 1/377; G02F 1/39; G02F 1/3503; H04J 14/06
See application file for complete search history.

(56) References Cited

U.S. PATENT DOCUMENTS 5,798,853 A * 8/1998 Watanabe ............. G02F 1/3538
398/152
6,304,348 B1 * 10/2001 Watanabe .......... H04B 10/2531
398/9

(Continued)

FOREIGN PATENT DOCUMENTS

JP    2015222314 A  * 12/2015
JP    6110547 B1  *  4/2017
(Continued)

OTHER PUBLICATIONS

International Search Report dated May 21, 2019, issued in PCT Application No. PCT/JP2019/009052, filed Mar. 7, 2019.
(Continued)

*Primary Examiner* — Tanya T Motsinger
(74) *Attorney, Agent, or Firm* — Workman Nydegger

(57) ABSTRACT

The present invention provides a configuration of a novel optical transmitter which outputs stable PDM signals. The novel optical transmitter generates phase conjugate light using a single second-order non-linear optical element included in a phase conjugate light generator with a looped configuration. A relative phase of main signal light with respect to excitation light and phase conjugate light of the main signal light stabilizes between two polarized components, and a PDM signal including a pair of a polarization-
(Continued)

multiplexed signal and phase conjugate light in a stable phase state can be generated and transmitted. The present invention can provide an optical transmitter that generates a PDM signal in which a variation in a phase between quadrature polarized waves is suppressed. By stabilizing quality of a PDM transmission signal on a side of the optical transmitter, a phase sensitive amplifier in a polarization diversity configuration can be operated in a stable manner.

12 Claims, 9 Drawing Sheets

(51) Int. Cl.
    *G02F 1/377*          (2006.01)
    *G02F 1/39*            (2006.01)
    *H04J 14/06*         (2006.01)

(52) U.S. Cl.
    CPC .............. *G02F 1/39* (2013.01); *H04J 14/06* (2013.01); *G02F 1/3503* (2021.01)

(56) References Cited

U.S. PATENT DOCUMENTS

| | | | | |
|---|---|---|---|---|
| 6,608,854 | B1* | 8/2003 | Watanabe | H04B 10/299 372/96 |
| 11,256,157 | B2* | 2/2022 | Druon | G02F 1/39 |
| 2011/0051227 | A1* | 3/2011 | Arahira | G02F 1/39 359/328 |
| 2011/0073783 | A1* | 3/2011 | Arahira | H04L 9/0858 250/493.1 |
| 2017/0280211 | A1* | 9/2017 | Damaghi | G02B 6/4457 |
| 2018/0231870 | A1* | 8/2018 | Takasaka | G02F 1/39 |
| 2019/0346738 | A1* | 11/2019 | Takeyama | G02F 1/395 |
| 2021/0044358 | A1* | 2/2021 | Kazama | G02F 1/377 |
| 2021/0080987 | A1* | 3/2021 | Rodriguez | G05F 1/44 |
| 2021/0088873 | A1* | 3/2021 | Inagaki | G06E 3/001 |
| 2021/0382139 | A1* | 12/2021 | du Plessis | G01S 7/38 |
| 2021/0387286 | A1* | 12/2021 | Ungaro | B23K 26/0738 |
| 2022/0019125 | A1* | 1/2022 | Kazama | G02F 1/377 |
| 2022/0043320 | A1* | 2/2022 | Kawakami | G02F 1/212 |
| 2022/0060273 | A1* | 2/2022 | Kato | H01S 3/094 |

FOREIGN PATENT DOCUMENTS

| | | |
|---|---|---|
| JP | 2017219749 A * 12/2017 | |
| WO | WO-2017219749 A1 * 12/2017 | ............ G06F 12/08 |

OTHER PUBLICATIONS

T. Umeki, et al., *Phase Sensitive Degenerate Parametric Amplification Using Directly-Bonded PPLN Ridge Waveguides*, Optics Express, 2011, vol. 19, No. 7, p. 6326-6332.

M. Asobe, et al., *In-Line Phase-Sensitive Amplifier for QPSK Signal Using Multiple QPM Linbo3 Waveguide*, In Proceedings of the OptoElectronics and Communications Conference, OECC, 2013, PDP paper PD2-3, pp. 2.

T. Umeki, et al., *First Demonstration of High-Order QAM Signal Amplification In PPLN-Based Phase Sensitive Amplifier*, Optics Express, Feb. 2014, vol. 22, No. 3, p. 2473-2482.

T. Umeki, et al., *PDM Signal Amplification Using PPLN-Based Polarization-Independent Phase Sensitive Amplifier*, Journal of Lightwave Technology, 2015, vol. 33, No. 7, pp. 1326-1332.

Masashi Abe, et al., *PDM-QPSK WDM Signal Amplification Using PPLN-Based Polarization-Independent In-Line Phase-Sensitive Amplifier*, Proceeding of European Conference on Optical Communication (ECOC) Dusseldorf 2016, paper W.4.P1.SC2.11, pp. 3.

* cited by examiner

OPTICAL SIGNAL TRANSMITTER

BACKGROUND ART

The present invention relates to an optical transmitter used in an optical communication system or an optical measurement system and to an optical transmission system using the optical transmitter.

In conventional optical transmission systems, in order to reproduce a signal having been attenuated when propagating through an optical fiber, an identification and reproduction optical repeater is used which converts an optical signal into an electric signal and reproduces the optical signal after identifying a digital signal. Identification and reproduction optical repeaters have a problem of limitation of response speed of an electronic part that performs photoelectric conversion and a problem of an increase in power consumption. In consideration thereof, fiber laser amplifiers which input excitation light into an optical fiber doped with a rare-earth element to amplify signal light while retaining its light form and semiconductor laser amplifiers have emerged. These laser amplifiers are not equipped with a function for shaping deteriorated signal light waveforms. Conversely, contamination of inevitably and randomly created spontaneous emission light occurs completely independent of a signal component and S/N of signal light drops by at least 3 dB before and after amplification. A drop in S/N causes a transmission code error rate to increase during digital signal transmission and results in a decline in transmission quality.

A phase sensitive amplifier (PSA) is being considered as means for overcoming the limitations of laser amplifiers. A PSA has a function of shaping a signal light waveform or a phase signal having been deteriorated under the influence of dispersion of a transmission fiber. Spontaneous emission light having a quadrature phase that is independent of the signal can be suppressed and spontaneous emission light in phase with the signal can also be minimized. Therefore, in principle, S/N of signal light before and after amplification can be prevented from deteriorating and can be kept the same.

FIG. 1 is a diagram showing a basic configuration of a PSA according to conventional art. A PSA 100 includes a phase sensitive amplifying unit 101 using optical parametric amplification, an excitation light source 102, an excitation light phase control unit 103, a first optical branching unit 104-1, and a second optical branching unit 104-2. As shown in FIG. 1, a signal light 110 input to the PSA 100 is branched into two parts by the optical branching unit 104-1, with one part being incident to the phase sensitive amplifying unit 101 and the other part being incident to the excitation light source 102. An excitation light 111 emitted from the excitation light source 102 undergoes phase regulation via the excitation light phase control unit 103 and is incident to the phase sensitive amplifying unit 101. Based on the input signal light 110 and the excitation light 111, the phase sensitive amplifying unit 101 outputs output signal light 112.

The phase sensitive amplifying unit 101 has a characteristic of amplifying the signal light 110 when the phase of the signal light 110 and the phase of the excitation light 111 match each other and attenuating the signal light 110 when the phases are in a quadrature phase relationship of being 90 degrees out of phase. By using this characteristic to match the phases of the excitation light 111 and the signal light 110 so as to maximize amplification gain, spontaneous emission light with a quadrature phase with respect to the signal light 110 is not created and, at the same time, spontaneous emission light that exceeds noise contained in the signal light is not created with respect to the in-phase component. Therefore, the signal light 110 can be amplified without deteriorating an S/N ratio.

In order to achieve phase lock of the signal light 110 and the excitation light 111, the excitation light phase control unit 103 controls the phase of the excitation light 111 so as to become locked with the phase of the signal light 110 having been branched by the first optical branching unit 104-1. The excitation light phase control unit 103 detects a part of the output signal light 112 having been branched by the second optical branching unit 104-2 with a narrow band detector and controls the phase of the excitation light 111 so as to maximize amplification gain of the output signal light 112.

Non-linear optical media for performing the parametric amplification described above include second-order non-linear optical materials typified by a periodic polarization-reversed $LiNbO_3$ (PPLN) waveguide and third-order non-linear optical materials typified by quartz glass fiber.

FIG. 2 is a diagram showing a configuration of a PSA according to conventional art which uses a PPLN waveguide (refer to NPL1). A PSA 200 shown in FIG. 2 includes an erbium-doped fiber laser amplifier (EDFA) 201, a first second-order non-linear optical element 202 and a second second-order non-linear optical element 204, a first optical branching unit 203-1 and a second optical branching unit 203-2, a phase modulator 205, an optical fiber expander 206, a polarization maintaining fiber 207, a photodetector 208, and a phase-locked loop (PLL) circuit 209. The first second-order non-linear optical element 202 includes a first free space optical system 211, a first PPLN waveguide 212, a second free space optical system 213, and a first dichroic mirror 214. The second second-order non-linear optical element 204 has a similar configuration and a detailed description thereof will be omitted.

Signal light 250 incident to the PSA 200 shown in FIG. 2 is branched by the optical branching unit 203-1 with one part being incident to the second second-order non-linear optical element 204. The other branched light is phase-controlled as excitation fundamental wave light 251 via the phase modulator 205 and the optical fiber expander 206 is incident to the EDFA 201. The EDFA 201 sufficiently amplifies the incident excitation fundamental wave light 251 and causes the excitation fundamental wave light 251 to be incident to the first second-order non-linear optical element 202. Due to the EDFA 201, the first second-order non-linear optical element 202 is capable of obtaining sufficient power in order to obtain a non-linear optical effect from the weak excitation fundamental wave light 251. In the first second-order non-linear optical element 202, second harmonic light (hereinafter, SH light) 252 is created from the incident excitation fundamental wave light 251. The created SH light 252 is incident to the second second-order non-linear optical element 204 via the polarization maintaining fiber 207. At the second second-order non-linear optical element 204, by performing degenerate parametric amplification with the incident signal light 250 and the SH light 252, phase sensitive amplification is performed and output signal light 253 is output.

In a PSA, in order to only amplify signal light in phase with excitation light, the signal light and the excitation light must be in phase as described above or be out of phase by exactly $\pi$ radians. In other words, when using a second-order non-linear optical effect, a phase $\phi_{2\omega s}$ of the excitation light which is a wavelength corresponding to SH light and a phase $\phi_{\omega s}$ of the signal light must satisfy a relationship expressed by expression (1) below, where n denotes an integer.

$$\Delta\phi = \tfrac{1}{2}(\phi_{2\omega s} - \phi_{\omega s}) = n\pi \qquad \text{Expression (1)}$$

FIG. 3 is a diagram showing a relationship between a phase difference Δϕ between input signal light and excitation light and gain in the case of a PSA using a second-order non-linear optical effect according to conventional art. The diagram shows that gain (dB) represented by an ordinate is maximized when the phase difference Δϕ represented by an abscissa is −π, 0, or π.

In order to achieve phase lock between the signal light 250 and the excitation fundamental wave light 251, first, the excitation fundamental wave light 251 is subjected to phase modulation by a weak pilot signal with the phase modulator 205 and a part of the output signal light 253 is branched and detected by the detector 208. The pilot signal component is minimized in a phase-locked state where the phase difference Δϕ shown in FIG. 3 is minimized. Therefore, feedback is performed to the optical fiber expander 206 using the PLL circuit 209 so as to minimize the pilot signal or, in other words, to maximize an amplified output signal. Phase lock between the signal light 250 and the excitation fundamental wave light 251 can be achieved by controlling the phase of the excitation fundamental wave light 251 with the optical fiber expander 206.

As will be described below, amidst demands for increased speed and increased capacity in optical communication, an application range of PSAs are expanding in terms of corresponding modulation systems and multiplexing systems. As shown in FIG. 3, since a conventional PSA using a PPLN waveguide has a characteristic of attenuating a quadrature phase component, a conventional PSA is applicable to amplification of a modulated signal such as intensity modulation-direct detection (IMDD), binary phase shift keying (BPSK), and differential phase shift keying (DPSK) which use normal intensity modulation or binary phase modulation. However, a conventional PSA is incapable of amplification of a modulated signal such as QPSK (quadrature phase shift keying) and 8 PSK which are multilevel modulation formats.

In order to extract a carrier from a signal light in a multilevel modulation format, the higher the degree of levels of a modulated signal, the larger the number of non-linear processes that must be used. In such a case, it is difficult to maintain S/N of fundamental wave light generated by carrier extraction from the signal light. In addition, in a configuration of a carrier extraction method using a non-linear process a plurality of times, a WDM (wavelength division multiplexing) signal obtained by wavelength multiplexing of a plurality of signals cannot be amplified collectively.

In consideration thereof, NPL2 and NPL3 disclose configurations that enable phase sensitive amplification of a modulated signal such as QPSK to be performed by adopting a configuration based on non-degenerate parametric amplification using a pair of signal light and phase conjugate light thereof. NPL2 discloses a method using quartz glass fiber that is a third-order non-linear optical material and NPL3 discloses a method using PPLN that is a second-order non-linear optical material.

FIG. 4 is a diagram showing a configuration of a PSA 400 which is based on non-degenerate parametric amplification according to conventional art and which uses a pair constituted by main signal light and phase conjugate light thereof as signal light. The PSA 400 shown in FIG. 4 is constituted by an optical transmitter 401 and a phase sensitive amplifier 420.

In order to create wavelength-multiplexed signal light 405, the optical transmitter 401 includes a signal light source 402 (for example, 16 LDs 1 to 16) which outputs beams of CW light with mutually different wavelengths, a modulator 403 corresponding to each LD, and array waveguide gratings (AWG) 404. In addition, in order to generate excitation light, the optical transmitter 401 includes a local oscillation light source (LO) 407, an optical branch 408, an EDFA 409, a BPF 410, a second-order non-linear optical element 411 for second harmonic generation (SHG), and a second-order non-linear optical element 406 for difference frequency generation (DFG).

In order to generate excitation light, the phase sensitive amplifier 420 includes a phase modulator (PM) 431, an EDFA 432, a BPF 433, and a second-order non-linear optical element 434 for SHG. Furthermore, for optical parametric amplification and phase control, the phase sensitive amplifier 420 includes a fixed delay line 424, an optical fiber expander/contractor 425 using a PZT piezoelectric element, a second-order non-linear optical element 426 for optical parametric amplification (OPA), an optical branch 427, a BPF 4283, a photodetector 429, and a PLL circuit 430.

After superimposing a data signal on each of the plurality of signal light sources 402 (LD1 to LD16) with the modulator 403, the optical transmitter 401 performs wavelength multiplexing using the AWG 404. SH light 441 is created by the second-order non-linear optical element 411 for SHG from fundamental wave excitation light 440 output from the local oscillation light source 407 which differs from the signal light source 402. Subsequently, difference frequency light of the SH excitation light 441 and the main signal light group 405 is created using the second-order non-linear optical element 406 for DFG. The difference frequency light created at this point is phase conjugate light (idler light) of the main signal light 405. A signal light group 442 constituted by a pair of a main signal light group 421 and an idler light group 423 and a part of fundamental wave excitation light 443 are output from the optical transmitter 401. It should be noted that a frequency (a wavelength) of the fundamental wave excitation light is at a position indicated by a dotted line 422 with respect to the main signal light group 421 and the idler light group 423.

The fundamental wave excitation light 443 output from the optical transmitter 401 is subjected to phase control by the phase modulator 431 and is incident to the EDFA 432 in the phase sensitive amplifier 420. The EDFA 432 amplifies the fundamental wave excitation light output from the phase modulator 431. The bandpass filter 433 removes noise light created by the EDFA 432 and only allows the fundamental wave excitation light to pass. The second-order non-linear optical element 434 for SHG creates SH light from the fundamental wave excitation light output from the bandpass filter 433 and causes the SH light to be incident to the second-order non-linear optical element 426 as excitation light 444.

For the purpose of delay time regulation between the signal light group 442 and the excitation light 443, the fixed delay line 424 delays the signal light group 442 output from the optical transmitter 401 by a prescribed time. The signal light group having passed through the fixed delay line 424 is subjected to phase control by the optical fiber expander/contractor 425 and is incident to the second-order non-linear optical element 426 for OPA. The second-order non-linear optical element 426 amplifies the signal light group and the idler light group using a parametric amplification effect.

The optical branch 427 branches a part of the amplified signal light group. The bandpass filter 428 allows only one arbitrary wavelength to pass among the signal light group and causes the passed light to be incident to the photodetector 429. The photodetector 429 converts the incident light into an electric signal. The PLL circuit 430 performs feedback to the optical fiber expander/contractor 425 so as to maximize the electric signal detected by the photodetector 429. The optical fiber expander/contractor 425 expands or contracts an optical fiber through which the signal light group 442 propagates in accordance with control output of the PLL circuit 430. By controlling the phase of the signal light group 442, phase lock between the signal light group 421 and the idler light group 442 and the excitation light 443 can be achieved.

Recent digitally-coherent optical communication systems also use polarization-multiplexed signals created by a polarization division multiplexing (PDM) technique. Since a non-linear optical medium such as a PPLN waveguide generally has polarization dependency, PSAs according to conventional art are incapable of amplifying polarization-multiplexed signals. By contrast, NPL4 and NPL5 disclose configurations which perform phase sensitive amplification on polarization-multiplexed signals with a polarization diversity configuration using two non-linear optical media to be described below with reference to FIG. 5.

FIG. 5 is a diagram showing an outline of an optical transmission system according to conventional art which transmits polarization-multiplexed signal light. An optical transmission system 500 is constituted by an optical amplification apparatus having an optical transmitter 501, an optical fiber transmission path 503, and a polarization diversity configuration 520. In the polarization diversity configuration 520, a polarization-multiplexed signal transmitted through an optical fiber 510 is separated by a polarizing beam splitter (PBS) 521. After performing optical amplification on the two separated polarized components by phase sensitive amplifiers 522 and 523 respectively constituted by a non-linear optical element, the polarized components are once again multiplexed by a PBS 524. As will be described later, a PDM signal that is a transmitted signal of an optical transmission system that transmits polarization-multiplexed signal light is independently modulated between quadrature polarized waves by different pieces of data. In addition, unlike the configuration shown in FIG. 4 in which a transmitter and a PDA are close to each other, in the optical transmission system shown in FIG. 5, the optical transmitter 501 and the polarization diversity configuration 520 are separated from each other. Therefore, excitation light is transmitted together with a PDM signal.

CITATION LIST

Non Patent Literature

NPL1: T. Umeki, O. Tadanaga, A. Takada and M. Asobe, "Phase sensitive degenerate parametric amplification using directly-bonded PPLN ridge waveguides," Optics Express, 2011, Vol. 19, No. 7, p. 6326-6332

NPL2: M. Asobe, T. Umeki, H. Takenouchi, and Y. Miyamoto, "In-line phase-sensitive amplifier for QPSK signal using multiple QPM LiNbO3 waveguide," In Proceedings of the OptoElectronics and Communications Conference, OECC, 2013, PDP paper PD2-3

NPL3: T. Umeki, O. Tadanaga, M. Asobe, Y. Miyamoto and H. Takenouchi., "First demonstration of high-order QAM signal amplification in PPLN-based phase sensitive amplifier," Optics Express, February 2014, Vol. 22, No. 3, p. 2473-2482

NPL4: T. Umeki, et al., "PDM Signal Amplification Using PPLN-Based Polarization-Independent Phase-Sensitive Amplifier", JOURNAL OF LIGHTWAVE TECHNOLOGY, 2015, Vol. 33, No. 7, pp. 1326-1332

NPL5: Masashi Abe, et al., "PDM-QPSK WDM Signal Amplification Using PPLN-Based Polarization-Independent In-Line Phase-Sensitive Amplifier," Proceeding of European Conference on Optical Communication (ECOC) Dusseldorf 2016, paper W.4.P1.SC2.11

SUMMARY OF THE INVENTION

Technical Problem

However, with an optical transmission system which transmits polarization-multiplexed signal light according to conventional art, there are problems attributable to instability of a polarization state in an optical transmitter such as those described below. Utilizing PSA based on non-degenerate parametric amplification using a pair of main signal light and phase conjugate light thereof requires that a phase lock condition be satisfied in each quadrature polarized component with respect to all pairs of different wavelengths. With a generation method of polarization-multiplexed signal light by the optical transmitter 501 in an optical transmission system according to conventional art such as that shown in FIG. 5, there is a problem that an amplification operation in the phase sensitive amplifier of the polarization diversity configuration 520 becomes unstable.

An overview of a configuration and operations of an optical transmitter will now be provided by once again referring to FIG. 5. The optical transmitter 501 is constituted by two signal arms (routes) which generate different pairs of main signal light and phase conjugate light. CW light from a signal light source 502 of the optical transmitter 501 applies modulation with different data signals with respect to two quadrature polarized waves (TE polarized light and TM polarized light) using an optical modulator. Polarization-multiplexed signal light 530 is separated into two polarized components using a PBS 504. Polarization-multiplexed signal light 531 of one of the separated polarized waves (TE polarized light) is rotated by 90 degrees by a polarization rotator 508 and shaped into a state of TM polarized light by each signal arm. Subsequently, phase conjugate light with respect to the main signal light is generated by phase sensitive amplifiers 506 and 507 respectively constituted by a non-linear optical element. After restoring the polarized wave having been rotated into TM polarized light and used to generate phase conjugate light to original TE polarized light 532 by a polarization rotator 509, multiplexing is performed by the PBS 505 and a pair of a polarization-multiplexed quadrature signal and phase conjugate light or, in other words, a PDM signal 533 is output.

A polarized wave of the PDM signal 533 from the optical transmitter 501 is rotated inside the optical fiber 510 that is a transmission path. When a PDM signal 534 subjected to polarization rotation is input to the polarization diversity configuration 520, the PDM signal 534 is branched into photoelectric field components projected onto two polarization axes of a first-stage PBS 521. In other words, the PDM signal 534 is incident to non-linear optical elements 522 and 523 in a state where the two original quadrature polarized components are respectively mixed therein.

FIG. 6 is a diagram conceptually illustrating a state of a polarization in an optical transmission system of PDM light according to conventional art. In FIG. 6, (a) shows two quadrature polarized waves of a PDM signal 553 at a point A of output of the optical transmitter 501. If an abscissa represents an s polarization state, an ordinate represents a p polarization state. In FIG. 6, (b) shows a polarization state of the PDM signal 534 at a point B after being transmitted through the optical fiber 510 in which polarization rotation that cumulatively occurs over the entire optical fiber has been added to the PDM signal 533 at the output point A of the optical transmitter 501. In FIG. 6, (c) shows an electric field component on each polarization axis of beams of signal light 536 and 535 at a point C1 and a point C2 after polarization and separation by the first-stage PBS 521. Each polarized component of the PDM signal 534 at the point B is separated in a state where components projected onto the two axes of the PBS 521 are mixed therein.

Each of the phase sensitive amplifiers 522 and 523 which independently perform phase sensitive amplification monitors a part of output with a phase-locked configuration such as that shown in FIG. 2 and applies feedback to regulate a relative phase between excitation light and a signal light group so as to maximize the output. In the polarization diversity configuration 520, a PDM signal is incident in a state where two quadrature polarized components are respectively mixed therein as shown in (c) in FIG. 6. Unless a phase sensitive amplification condition is simultaneously satisfied in a stable manner in each phase sensitive amplifier with respect to the two quadrature polarized components, the PDM signal after optical amplification cannot be stabilized.

A state where two polarized components are mixed as shown in (c) in FIG. 6 is in itself not a problem in the polarization diversity configuration 520. However, when a polarization state of the PDM signal 534 received at the point B fluctuates, a PDM signal 537 which is an output of the phase sensitive amplifier also becomes unstable. In this case, a fluctuation of a polarization state which occurs on an optical transmission path is also not addressed. The problem here is fluctuation of the phases of the two quadrature polarized components that occur when generating a PDM signal in the optical transmitter 501.

The optical transmitter 501 is normally constituted by a light source, an optical semiconductor element, optical parts, and a polarization maintaining fiber that connects these components to each other or the like. Furthermore, a module configuration is adopted which includes a control circuit for controlling these components, interface circuits inside and outside an apparatus, and a power supply. In such an apparatus, due to an operating state of the optical transmitter and a variation in environmental temperature, internal temperature may become non-uniformly distributed and the distribution may change constantly. In addition, depending on an environment outside the apparatus or an operating state of the apparatus, vibration from the outside may be applied to the connecting optical fibers between parts or to optical parts inside the apparatus. As described with reference to FIG. 5, in the optical transmitter 501, a signal light group is respectively generated on two signal arms by separate difference frequency generators (second-order non-linear optical elements for DFG) 506 and 507 and the signal light groups are polarization-multiplexed by the PBS 505. Operating states of the two signal arms may independently be affected by temperature variation, vibration, and the like. Therefore, phases of signal light, phase conjugate light, and pilot light may also vary in different modes due to the two signal arms. Furthermore, phases of excitation light supplied to the two difference frequency generators 506 and 507 may also vary in different modes. Due to individual variations in phase conditions between the two arms that generate polarization-multiplexed light, the relative phase between the two polarized waves constantly vary in a periodic or irregular manner and fluctuation may occur. In this manner, when the relative phase between the two signal light arms in the optical transmitter 501 contains fluctuation, the PDM signal 533 itself becomes unstable. The PDM signal 534 after being transmitted through the optical fiber 510 directly affects stability of phase sensitive amplification operations in the polarization diversity configuration.

Referring to (c) in FIG. 6, in the polarization diversity configuration, two polarized components are separated from PBS in a mixed state and the two mixed polarized components are input to the respective phase sensitive amplifiers. Therefore, when the relative phase of the signal light group differs between two polarized waves in an optical transmitter in which a PDM signal is formed, a phase condition for phase sensitive amplification shown in FIG. 3 and Expression (1) cannot be satisfied inside one phase sensitive amplifier. After being polarization-multiplexed, since a phase change applied to the two polarized waves by the optical fiber is the same, a change in the relative phase is small. On the other hand, since a variation or fluctuation of the relative phase between the two polarized waves which is created in the optical transmitter 501 is more direct, there is a real-time effect between the optical transmitter 501 and the polarization diversity configuration 520.

As described above, there is a problem in that a fluctuation in quality of a PDM signal output from the optical transmitter destabilizes output from the phase sensitive amplifiers 522 and 523 of the polarization diversity configuration 520. It is difficult to generate, in a stable manner, a PDM signal constituted by a pair of a polarization-multiplexed main signal and phase conjugate light with the optical transmitter 501 configured according to conventional art such as that shown in FIG. 5. Therefore, there is a need for a configuration of an optical transmitter which enables a polarization diversity configuration to operate in a stable manner and which is capable of generating signal light including a pair of a polarization-multiplexed signal and phase conjugate light with a stable phase state.

The present invention has been made in consideration of the problems described above and an object thereof is to provide an optical transmitter that generates a PDM signal in which a variation in a phase between quadrature polarized waves is suppressed.

Means for Solving the Problem

In order to achieve the object described above, an invention according to claim 1 is an optical transmitter which generates signal light and phase conjugate light thereof, the optical transmitter including: a polarization separator to which polarization-multiplexed and modulated signal light is input and which polarization-separates signal light of a first polarized component and signal light of a second polarized component that is orthogonal to the first polarized component and outputs the signal light of the polarized components to two output ports; a loop-type phase conjugate light generator having, on a path from one to another of the two output ports, the polarization separator, a polarization rotator which rotates by 90 degrees a polarized wave of the signal light of the first polarized component, and a first second-order non-linear optical element equipped with a first optical waveguide that generates phase conjugate light of the polarization-rotated signal light and phase conjugate light of the signal light of the second polarized component; an excitation light generator which supplies first excitation light that generates the phase conjugate light of the polarization-rotated signal light to one end of the first optical waveguide on a side where the polarization rotator is present and supplies second excitation light that generates the phase conjugate light of the second polarized component to the other end of the first optical waveguide; and a phase adjuster configured to change an optical path length of one of a path of the first excitation light or a path of the second excitation light in accordance with a level of combined light of the first excitation light and the second excitation light after generating the phase conjugate light.

An invention according to claim 2 is the optical transmitter according to claim 1, wherein the excitation light generator generates second harmonic light (SH light) from fundamental wave light, branches the SH light, and generates first SH excitation light that is the first excitation light and second SH excitation light that is the second excitation light, and the phase adjuster changes an optical path length of one of a path of the first SH excitation light or a path of the second SH excitation light. This optical transmitter corresponds to an optical transmitter according to a first embodiment.

An invention according to claim 3 is the optical transmitter according to claim 1, wherein the excitation light generator branches fundamental wave light and, based on the branched fundamental wave light, generates first second harmonic (SH) excitation light that is the first excitation light and second SH excitation light that is the second excitation light, and the phase adjuster changes an optical path length of any of paths of the branched fundamental wave light. This optical transmitter corresponds to an optical transmitter according to a second embodiment.

An invention according to claim 4 is an optical transmitter which generates signal light including pilot light and phase conjugate light thereof, the optical transmitter including: a polarization separator which polarization-separates pilot light and polarization-multiplexed and modulated signal light into signal light of a first polarized component and signal light of a second polarized component that is orthogonal to the first polarized component and outputs the signal light of the polarized components to two output ports; a loop-type phase conjugate light generator having, on a path from one to another of the two output ports, the polarization separator, a polarization rotator which rotates by 90 degrees a polarized wave of the signal light of the first polarized component, and a first second-order non-linear optical element equipped with a first optical waveguide that generates phase conjugate light of the polarization-rotated signal light and phase conjugate light of the signal light of the second polarized component and performs degenerate parametric amplification in each of two directly opposite propagation directions with respect to the polarization-separated pilot light; an excitation light generator which supplies first excitation light that generates the phase conjugate light of the polarization-rotated signal light to one end of the first optical waveguide on a side where the polarization rotator is present and supplies second excitation light that generates the phase conjugate light of the second polarized component to the other end of the first optical waveguide; and a phase adjuster configured to change an optical path length of a path of the pilot light in accordance with a level of the pilot light subjected to degenerate parametric amplification in a first direction among the two propagation directions and to change an optical path length of a path of the pilot light in accordance with a level of the pilot light subjected to degenerate parametric amplification in a second direction among the two propagation directions. This optical transmitter corresponds to an optical transmitter according to a third embodiment.

An invention according to claim 5 is the optical transmitter according to claim 4, wherein the excitation light generator generates second harmonic light (SH light) from fundamental wave light, branches the SH light, and generates first SH excitation light that is the first excitation light and second SH excitation light that is the second excitation light, and the pilot light is based on a part of the fundamental wave light.

An invention according to claim 6 is the optical transmitter according to any one of claim 2, 3, or 5, wherein the excitation light generator includes one or more second-order non-linear optical elements equipped with a second optical waveguide which generates the SH light from the fundamental wave light and generates the first SH excitation light and the second SH excitation light.

Preferably, the optical transmitter described above can further include a signal light generator which includes a plurality of light sources which output continuous wave light (CW light) and an external modulator which applies modulation to both polarized waves of the CW light from each of the plurality of light sources and which generates polarization-multiplexed and modulated signal light.

Preferably, in the optical transmitter described above, the optical waveguide included in the second-order non-linear optical element is a directly-bonded ridge waveguide, and the directly-bonded ridge waveguide can be constructed from any material of $LiNbO_3$, $KNbO_3$, $LiTaO_3$, $LiNb_{(x)}Ta_{(1-x)}O_3$ ($0 \leq x \leq 1$), and $KTiOPO_4$, or a material obtained by adding at least one material selected from a group consisting of Mg, Zn, Sc, and In as an additive to any of these materials.

Effects of the Invention

As described above, the present invention provides an optical transmitter that generates a PDM signal in which a variation in a phase between quadrature polarized waves is suppressed.

DESCRIPTION OF EMBODIMENTS

The present invention provides a configuration of a novel optical transmitter which outputs stable PDM signals. The novel optical transmitter generates phase conjugate light using a single second-order non-linear optical element included in a phase conjugate light generator with a looped configuration. A relative phase of main signal light with respect to fundamental wave excitation light and phase conjugate light of the main signal light stabilizes between two polarized components, and signal light including a pair of a polarization-multiplexed signal and phase conjugate light in a stable phase state can be generated. Hereinafter, each embodiment of the present invention will be described in detail with reference to the drawings.

First Embodiment

Figure 7:
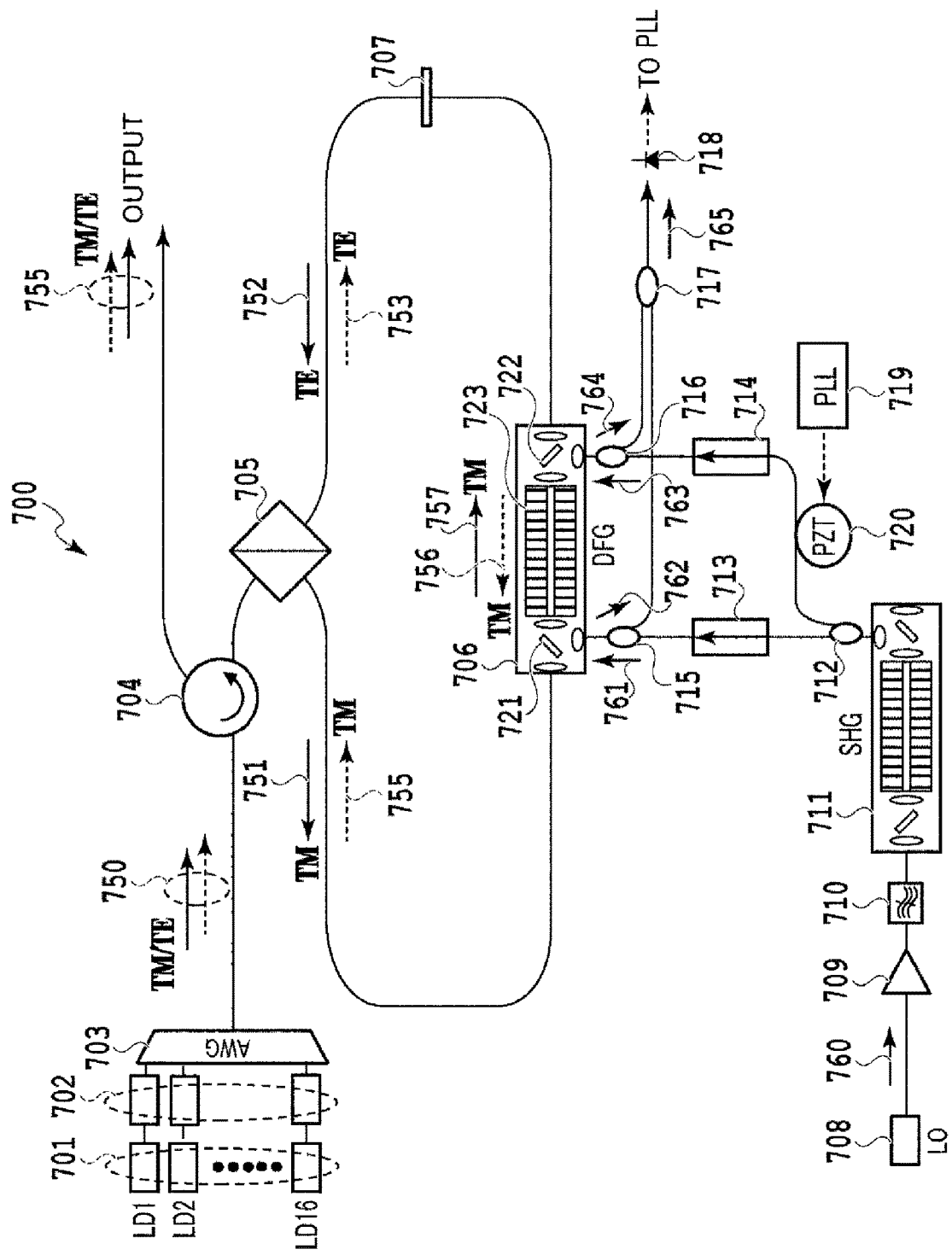
FIG. 7 is a diagram showing a configuration of an optical transmitter according to a first embodiment.

FIG. 7 is a diagram showing a configuration of an optical transmitter according to a first embodiment of the present invention. In the optical transmitter according to the present embodiment, a configuration example for generating a polarization-multiplexed signal light group constituted by a pair of main signal light and phase conjugate light thereof will be presented. Stable phase sensitive amplification can be realized in both of two quadrature polarized components of the polarization-multiplexed signal light group.

First, as primary components, in order to generate 750 main signals, an optical transmitter 700 includes a plurality of signal light sources 701 (LDs 1 to 16), a modulator 702 corresponding to each signal light source, and array waveguide gratings (AWG) 703. These elements constitute a signal light generator which generates polarization-multiplexed and modulated signal light. In addition, as primary components in order to generate PDM output 755 constituted by a pair of main signal light and phase conjugate light thereof, the optical transmitter 700 includes a second-order non-linear optical element 706 for DFG, a circulator 704, a polarizing beam splitter (PBS) 705, and a polarization rotator 707. The three elements of the second-order non-linear optical element 706, the PBS 705, and the polarization rotator 707 constitute a loop, and the second-order non-linear optical element 706 respectively generates phase conjugate light with respect to two polarized components. Therefore, this looped configuration including the second-order non-linear optical element operates as a phase conjugate light generator as will be described later.

In order to generate fundamental wave excitation light, the optical transmitter 700 includes a local oscillation light source (LO) 708, an EDFA 709, a BPF 710, a second-order non-linear optical element for SHG, an optical branch 712, and isolators 713 and 714. These elements constitute an excitation light generator. In addition, in order to achieve phase lock between excitation light and signal light, the optical transmitter 700 includes an optical fiber expander/contractor 720 using a PZT piezoelectric element, optical branches 715, 716, and 717, a photodetector 718, and a phase-locked loop (PLL) circuit 719. The phase-locked loop circuit formed by these elements constitutes a phase adjusting mechanism (a phase adjuster) of second harmonic (SH) excitation light.

Continuous wave light (CW light) output from the LO 708 is used as fundamental wave excitation light. The EDFA 709 amplifies fundamental wave light 760 from the LO 708. The BPF 710 removes noise light created by the EDFA 709 and only allows amplified fundamental wave light to pass.

A second-order non-linear optical element 711 for SHG internally includes a PPLN waveguide and an output-side dichroic mirror. When fundamental wave light having passed through the BPF 710 is incident to the second-order non-linear optical element 711, SH light with a wavelength which is half of that of the fundamental wave light is created by the PPLN waveguide. The fundamental wave light and the SH light are separated from each other by the output-side dichroic mirror. The SH light separated from the second-order non-linear optical element 711 is further branched into two parts by the optical branch 712. After respectively passing through the isolators 713 and 714 and the optical branches 715 and 716, the branched parts of the SH light are respectively incident to the second-order non-linear optical element 706 for DFG as first SH light 761 and second SH light 763.

Each of the plurality of signal light sources 701 (for example, 16 LDs) outputs continuous wave light (CW light) of which a wavelength differs from the LO 708. Output light of each signal light source is subjected to QPSK modulation using the external modulator 702 corresponding to each signal light source. The modulated light from the external modulator 702 is multiplexed by the AWG 703 and subsequently output as the polarization-multiplexed main signal light group 750 as denoted by TE/TE. The main signal light group 750 including two quadrature polarized components passes through the circulator 704 and is separated into the respective polarized components by the PBS 705.

The optical transmitter 700 according to the present invention adopts a configuration in which, after separating the polarization-multiplexed main signal light group into two polarized components by the PBS 705, each polarized component is incident from both sides of the single second-order non-linear optical element 706 for DFG. In other words, a difference from a configuration of an optical transmitter according to conventional art is that an operation of creating respective difference frequency light (phase conjugate light) of the two separated polarized components is realized by the shared single second-order non-linear optical element 706. In the optical transmitter 500 according to conventional art shown in FIG. 5, difference frequency generation operations are separately performed on two signal arms (routes) respectively including a second-order non-linear optical element. In contrast, in the optical transmitter 700 according to the present invention, after separating polarized waves by the PBS 705, difference frequency light or, in other words, phase conjugate light is created inside a loop including a shared single second-order non-linear optical element 706 and, subsequently, polarization-combined together with the created phase conjugate light by the same PBS 705.

The polarizing beam splitter (PBS) 705 functions as a polarization separator. Normally, the PBS 705 has one input port and two output ports and separates polarization-multiplexed light incident to the input port into two different polarized components. Since operating the input port—output port in an opposite direction enables polarization combinations, the PBS 705 also operates as a polarization combiner. Examples of a PBS include a prism-type PBS coated with a dielectric multi-layer and a waveguide structure PBS. In the optical transmitter according to the present invention, the PBS 705 first performs polarization separation into two polarized components and, after phase conjugate light is generated, once again performs polarization combinations with respect to the two polarized components of the signal light including the phase conjugate light.

In the optical transmitter 700, generation of each phase conjugate light beam with respect to the two polarized waves is performed by a single component in an optical path of a looped configuration. Therefore, with the exception of a difference in propagation directions, optical paths can be made completely equal with respect to the two polarized components. Even if various environmental variations or external actions which may cause a fluctuation in a relative phase between the two polarized components are created with respect to the optical paths, such an environmental variation or an external action is to be simultaneously and equally applied to the two polarized components. Therefore, a variation in phase that occurs in the case of conventional art in which polarization separation is performed by two signal arms can be reduced to an ignorable level. In addition, bidirectionally using the second-order non-linear optical element 706 by adopting a looped configuration for an optical path eliminates the need to provide a second-order non-linear optical element for each polarized component as in the case of conventional art and, consequently, the number of parts can be reduced. Next, operations of phase conjugate light generation as each phase conjugate light generator with a looped configuration will be described in detail for each polarized component.

When a TE polarized component in the signal light group 750 is separated by the PBS 705, the TE polarized component is introduced clockwise into the loop as indicated by TE polarized signal light 753 depicted by a dotted arrow in FIG. 7. A polarization direction of the TE polarized signal light is rotated by 90 degrees using the polarization rotator 707 and the TE polarized signal light becomes a TM polarized wave. TM polarized signal light 756 is incident leftward to the second-order non-linear optical element 706 from a right side of the second-order non-linear optical element 706 in the diagram. As the polarization rotator 707, an optical element that rotates linear polarized light by 90 degrees such as a λ/2 wavelength plate may be used or a mechanism to be connected which physically rotates a polarization maintaining fiber by 90 degrees may be used.

The second-order non-linear optical element 706 for DFG respectively includes dichroic mirrors 721 and 722 on both input and output sides and includes a PPLN waveguide 723. The TM polarized signal light 756 and the SH excitation light 763 are multiplexed by the dichroic mirror 722 and are incident to the PPLN waveguide 723. The TM polarized signal light 756 is TM polarized signal light 756 incident from a right side of the second-order non-linear optical element 706. The SH excitation light 763 is SH excitation light 763 output from the second-order non-linear optical element 711 and incident from a right side of the second-order non-linear optical element 711. The TM polarized signal light 756 and the SH excitation light 763 are multiplexed by the dichroic mirror 722 and are incident to the PPLN waveguide 723. In the PPLN waveguide 723, difference frequency light between the clockwise TM polarized signal light 756 and the SH excitation light 763 is created. The difference frequency light is separated as the TE polarized signal light 753 by the PBS 705 and is subsequently polarization-rotated to become phase conjugate light with respect to the TM polarized signal light 756 which propagates through the second-order non-linear optical element 706 clockwise in the loop. Using the dichroic mirror 721 on a left side of the second-order non-linear optical element 706, a signal light group constituted by a pair of the TM polarized signal light and phase conjugate light thereof is separated from the SH excitation light and a TM polarized signal light group 755 is output. Subsequently, the TM polarized signal light group 755 is once again polarization-combined by the PBS 705 and propagates through the circulator 704 toward an output port of the optical transmitter 700 as a PDM signal 755. As described above, the TM polarized component prior to being separated by the PBS 705 is output as a TE polarized component in a final PDM signal.

In a similar manner to the TE polarized component described above, when a TM polarized component in the signal light group 750 is separated by the PBS 705, the TM polarized component is introduced counter-clockwise into the loop as indicated by a TM polarized signal light 751 depicted by a solid arrow in FIG. 7. The TM polarized signal light 751 is incident rightward to the second-order non-linear optical element 706 from a left side of the diagram. The TM polarized signal light incident from the left side of the second-order non-linear optical element 706 and the SH excitation light 761 output from the second-order non-linear optical element 711 and incident from the left side of the second-order non-linear optical element 711 are multiplexed by the dichroic mirror 721 and are incident to the PPLN waveguide 723. In the PPLN waveguide 723, difference frequency light between the counter-clockwise TM polarized signal light 757 and the SH excitation light 761 is created. The difference frequency light is separated as the TM polarized signal light 751 by the PBS 705 and is input counter-clockwise in the loop. Subsequently, the difference frequency light becomes phase conjugate light with respect to TM polarized signal light 757 which propagates through the second-order non-linear optical element 706. Using the dichroic mirror 722 on a right side of the second-order non-linear optical element 706, a signal light group constituted by a pair of the TM polarized signal light 757 and phase conjugate light thereof is separated from the SH excitation light 761 and a TM polarized signal light group is output. The TM polarized signal light group is polarization-rotated by the polarization rotator 707 and becomes a TE polarized signal light group 752. Subsequently, the TE polarized signal light group 752 is once again polarization-combined by the PBS 705 and propagates through the circulator 704 toward an output port of the optical transmitter 700 as a PDM signal 755.

As described above, in the optical transmitter 700 according to the present invention, a shared single second-order non-linear optical element 706 is bidirectionally used by adopting a looped configuration for an optical path for generating phase conjugate light. By independently performing optical sensitive amplification with respect to two polarized components with opposite propagation directions of an optical signal and subsequently once again multiplexing the two polarized components with a PBS, a signal light group constituted by polarization-multiplexed main signal light and phase conjugate light thereof is generated. The signal light group is sent to an optical fiber as a polarization-multiplexed PDM output 755 of the transmitter.

In an optical transmitter having the phase conjugate light generator with the looped configuration shown in FIG. 7, the SH excitation light is generated by the second-order non-linear optical element 711 for SHG and, after being branched, input as beams of SH excitation light 761 and 763 to ports on both ends of the second-order non-linear optical element 706 for DFG. Each SH excitation light beam is used to generate phase conjugate light of a corresponding polarized component at the PPLN waveguide 723 and is subsequently output to a port on an opposite side to the input side. Outputs of the output beams of SH excitation light 762 and 764 are partially branched using the optical branches 715 and 716. After multiplexing the two branched beams of SH excitation light 762 and 764 with the optical branch 717, the multiplexed excitation light is converted into an electric signal by the photodetector 718 and a change in light intensity of the combined light of HG excitation light is detected. The detected electric signal is supplied to the PLL circuit 719 and the PLL circuit 719 performs feedback to the fiber expander/contractor 720 so as to maximize the detected electric signal. Therefore, a feedback circuit including the optical branch 717, the photodetector 718, the PLL circuit 719, and the fiber expander/contractor 720 constitutes a phase adjusting function. After the SH light generated by the second-order non-linear optical element 711 is branched and used to bidirectionally generate phase conjugate light, the SH light is fed back to the optical fiber expander/contractor 720 on an optical path of one of the beams of SH excitation light so as to maximize interference of the once-again multiplexed SH excitation light.

Therefore, the present invention can be implemented as an optical transmitter 700 which generates signal light and phase conjugate light thereof, the optical transmitter including: a polarization separator 705 to which polarization-multiplexed and modulated signal light 750 is input and which polarization-separates signal light 753 of a first polarized component and signal light 751 of a second polarized component that is orthogonal to the first polarized component and outputs the signal light of the polarized components to two output ports; a loop-type phase conjugate light generator having, on a path from one to another of the two output ports, the polarization separator, a polarization rotator 707 which rotates by 90 degrees a polarized wave of the signal light of the first polarized component, and a first second-order non-linear optical element 706 equipped with a first optical waveguide 723 that generates phase conjugate light of the polarization-rotated signal light and phase conjugate light of the signal light of the second polarized component; an excitation light generator which supplies first excitation light 763 that generates the phase conjugate light of the polarization-rotated signal light to one end of the first optical waveguide on a side where the polarization rotator is present and supplies second excitation light 761 that generates the phase conjugate light of the second polarized component to the other end of the first optical waveguide; and a phase adjuster configured to change an optical path length of one of a path of the first excitation light and a path of the second excitation light in accordance with 756 levels of combined light of the first excitation light and the second excitation light after generating the phase conjugate light.

In the present embodiment, the excitation light generator generates second harmonic light (SH light) from the fundamental wave light 760, branches the SH light, and generates first SH excitation light 761 that is the first excitation light and second SH excitation light 763 that is the second excitation light. The phase adjuster changes an optical path length of one of a path of the first SH excitation light or a path of the second SH excitation light.

By performing feedback to the optical fiber expander/contractor 720 and performing phase adjustment between the two beams of SH excitation light, a drift in a relative phase of the two beams of SH excitation light due to a temperature variation or a temperature non-uniformity inside the optical transmitter or external vibration is compensated. A relative phase between the two beams of SH excitation light used to generate respective beams of phase conjugate light of the TE polarized component and the TM polarized component can be always kept in a locked state. Reference phases of the main signal light and phase conjugate light thereof which is generated by the second-order non-linear optical element 706 or, in other words, reference phases of the TE polarized signal group 752 and the TM polarized signal group 755 are determined by phases of corresponding beams of SH excitation light 761 and 763.

When performing non-degenerate phase sensitive amplification including a polarization diversity configuration, a phase of SH excitation light used by a phase sensitive amplifier must be matched with a reference phase of main signal light and phase conjugate light thereof. Therefore, as a prerequisite thereof, even when generating phase conjugate light of signal light having been polarization-multiplexed by an optical transmitter-side, the reference phase must be locked between the two polarized waves. According to the configuration of the looped phase conjugate light generator shown in FIG. 7 described above, by locking the phase of the SH excitation light used for phase conjugate generation between the two polarized waves, a condition for phase sensitive amplification can be simultaneously satisfied by both polarized waves. Adopting the configuration of the looped phase conjugate light generator shown in FIG. 7 enables the PDM signal 755 to be transmitted in a state where the reference phase is locked between two quadrature polarized waves. Even in a repeater after transmission through the optical fiber shown in FIG. 5, the phase sensitive amplifiers 522 and 523 of the polarization diversity configuration 520 can be operated in a stable manner.

In the optical transmitter 700 according to the present embodiment, a PPLN waveguide capable of pseudo phase matching is used as a non-linear optical medium in the second-order non-linear optical elements 706 and 711. Hereinafter, a method of fabricating the PPLN waveguide used in the present embodiment will be exemplified. First, a periodic electrode with a period of approximately 17 μm was formed on Zn-doped LiNbO$_3$. Next, polarization-reversed gratings in accordance with the electrode pattern described above were formed inside Zn:LiNbO$_3$ by electric field application. Furthermore, a Zn:LiNbO$_3$ substrate having this periodic polarization-reversed structure was directly bonded onto a LiTaO$_3$ substrate to be a cladding, and the two substrates were subjected to heat treatment at 500° C. to be firmly bonded to each other.

Next, a core layer was thinned down to around 5 μm by polishing, and a 50 mm-long ridge-type optical waveguide was formed using a dry etching process. Temperature regulation of the optical waveguide can be performed by a Peltier element. A second-order non-linear optical element having a PPLN waveguide formed as described above was configured as a module that enables light to be input and output with a 1.5 μm-band polarization maintaining fiber. While Zn-doped LiNbO$_3$ was used in the present embodiment, other non-linear materials such as KNbO$_3$, LiTaO$_3$, LiNb$_{(x)}$Ta$_{(1-x)}$O$_3$ (0≤x≤1), and KTiOPO$_4$, or a material obtained by adding at least one material selected from a group consisting of Mg, Zn, Sc, and In as an additive to any of these materials may be used.

As described above, with the optical transmitter described in the present embodiment, a phase conjugate light generator with a looped configuration enables an optical wave obtained by polarization-multiplexing a signal light group constituted by main signal light and phase conjugate light thereof to be transmitted in a state where a relative phase between the two polarized waves is stabilized. Since the relative phase between two polarized waves and a reference phase of the signal light and the phase conjugate light thereof are stabilized, a phase sensitive amplifier with a polarization diversity configuration can be operated in a stable manner even in a repeater.

While the optical transmitter according to the present embodiment has been described as an example using a 16 QAM signal, any format with a higher degree of levels such as IMDD, BPSK, QPSK, 64 QAM, or 256 QAM may be used as a modulation format. Regardless of the format, polarization-multiplexed and modulated signal light can be generated by exactly the same configuration as the phase conjugate light generator with a looped configuration described in the present embodiment. With the optical transmitter according to the present embodiment, a phase state of a PDM signal to be transmitted is stabilized and a phase sensitive amplifier can be operated in a stable manner even on a side of a polarization diversity configuration of a repeater. Modulated signals of a multilevel modulation format can also be transmitted.

Second Embodiment

The optical transmitter according to the first embodiment described above is configured to detect a combination of two beams of SH excitation light and directly apply feedback to one of the beams of SH excitation light in order to stabilize a relative phase between two polarized waves for generating phase conjugate light. In a next second embodiment, a configuration of an optical transmitter that stabilizes a phase of fundamental wave excitation light instead of stabilizing a phase of SH excitation light will be described.

Figure 8:
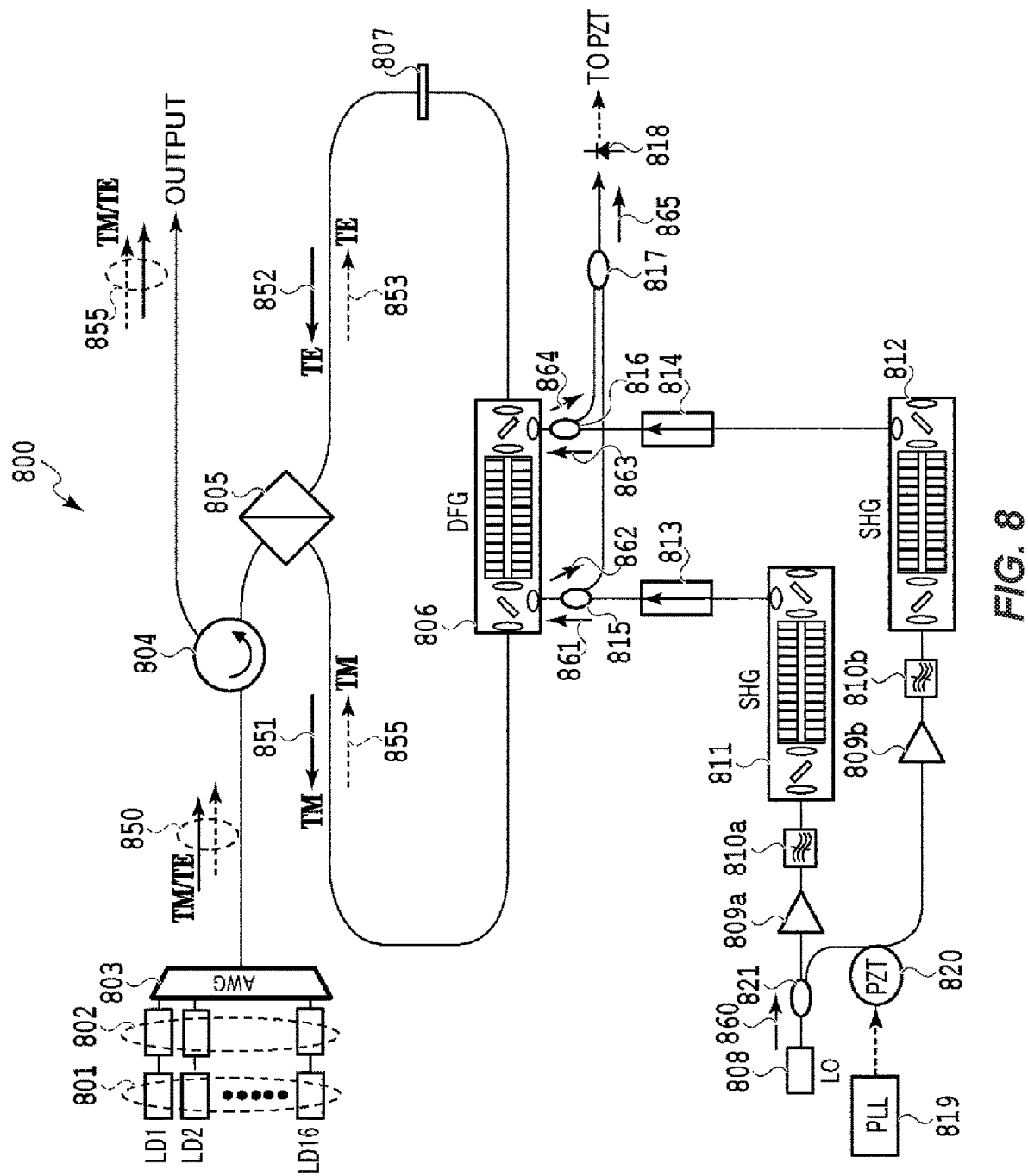
FIG. 8 is a diagram showing a configuration of an optical transmitter according to a second embodiment.

FIG. 8 is a block diagram showing a configuration of a transmitter according to the second embodiment of the present invention. Since an optical transmitter 800 is similar in configuration to that of the optical transmitter 700 according to the first embodiment shown in FIG. 7, redundant descriptions of similar components will be omitted and the description will focus on differences instead. A major difference from the first embodiment is that fundamental wave excitation light is first branched in order to generate two beams of SH excitation light and that separate second-order non-linear optical elements 811 and 812 for SHG are used. In other words, fundamental wave excitation light 860 from a local oscillation light source (LO) 808 is first branched into two parts by an optical branch 821. From the branched fundamental wave excitation light, two beams of SH excitation light 861 and 863 are obtained via two paths respectively constituted by an EDFA 809a, a BPF 810a, and the second-order non-linear optical element 811 for SHG and an EDFA 809b, a BPF 810b, and the second-order non-linear optical element 812 for SHG. These elements constitute an excitation light generator.

A configuration from a plurality of light sources 801 to AWG 803 for generating polarization-multiplexed main signal light 850 is the same as in the first embodiment, and a configuration of a looped phase conjugate light generator which is unique to the optical transmitter according to the present invention is also the same as in the first embodiment. In other words, a shared single second-order non-linear optical element 806 is bidirectionally used by adopting a looped configuration for an optical path for generating phase conjugate light. By independently performing optical sensitive amplification with respect to two polarized components with opposite propagation directions of an optical signal and subsequently once again multiplexing the two polarized components with a PBS 805, a PDM signal 855 constituted by a pair of a polarization-multiplexed main signal light group and a phase conjugate light group thereof is generated.

In an optical transmitter having the phase conjugate light generator with a looped configuration shown in FIG. 8, the beams of SH excitation light are generated by the second-order non-linear optical elements 811 and 812 for SHG and input as the beams of SH excitation light 861 and 863 to ports on both ends of the second-order non-linear optical element 806 for DFG. Each SH excitation light beam is used to generate phase conjugate light of a corresponding polarized component at the PPLN waveguide and is subsequently output to a port on an opposite side to the input side. Outputs of the output beams of SH excitation light 862 and 864 are partially branched using optical branches 815 and 816.

After multiplexing two branched beams of SH excitation light 862 and 864 with an optical branch 817, the multiplexed excitation light is converted into an electric signal by a photodetector 818 and a change in light intensity is detected. The multiplexed excitation light is converted into an electric signal by the photodetector 818 and a change in light intensity is detected.

The detected electric signal is supplied to a PLL circuit 819 and the PLL circuit 819 performs feedback to a fiber expander/contractor 820 provided on a path of one of the branched beams of fundamental wave excitation light so as to maximize the detected electric signal. Therefore, a feedback circuit including the optical branch 817, the photodetector 818, the PLL circuit 819, and the fiber expander/contractor 820 constitutes a phase adjusting function. After the beams of SH excitation light generated by the second-order non-linear optical elements 811 and 812 are used to bidirectionally generate phase conjugate light by the second-order non-linear optical element 806, the beams of SH excitation light are fed back to the optical fiber expander/contractor 820 on an optical path of one of the beams of fundamental wave excitation light so as to maximize interference of the once-again multiplexed SH excitation light.

Therefore, in the present embodiment, the excitation light generator branches fundamental wave light 860 and, based on the branched beams of fundamental wave light, generates first second harmonic (SH) excitation light 861 that is first excitation light and second harmonic (SH) excitation light 863 that is second excitation light, and the phase adjuster changes an optical path length of any of paths of the branched beams of fundamental wave light.

By performing feedback to the optical fiber expander/contractor 820 and performing phase adjustment between the two beams of SH excitation light, a drift in a relative phase of the two beams of SH excitation light due to a temperature variation or a temperature non-uniformity inside the optical transmitter or external vibration is compensated. Accordingly, a relative phase between the two beams of SH excitation light used to generate respective beams of phase conjugate light of the TE polarized component and the TM polarized component can be always kept in a locked state. According to the configuration of the looped phase conjugate light generator shown in FIG. 8 described above, by locking the phase of the SH excitation light used for phase conjugate generation between the two polarized waves, a condition for phase sensitive amplification can be simultaneously satisfied by both polarized waves. By adopting the configuration of the looped phase conjugate light generator shown in FIG. 7, after transmission of the PDM signal 855 through the optical fiber, the phase sensitive amplifiers 522 and 523 of the polarization diversity configuration 520 shown in FIG. 5 can be operated in a stable manner in a repeater.

Third Embodiment

The optical transmitters according to the two embodiments described above are configured to send out a signal light group constituted by a pair of a main signal and a phase conjugate light thereof as a PDM signal. In the present embodiment, a configuration example for further superimposing a pilot signal on the PDM signal described above and transmitting the superimposed signal at the same time as a signal light group will be described.

FIG. 8 is a block diagram showing a configuration of a transmitter according to a third embodiment of the present invention. Although an optical transmitter 900 shown in FIG. 9 has roughly the same configuration as the optical transmitter 700 according to the first embodiment shown in FIG. 7, the optical transmitter 900 has two differences as follows. Firstly, in order to include a pilot signal in a PDM signal, the optical transmitter 900 includes optical branches 915 and 925 and a polarization controller 924. Secondly, unlike the first and second embodiments, the optical transmitter 900 detects pilot light instead of SH excitation light for the purpose of phase adjustment and includes two separate and independent phases adjusting mechanisms with respect to two polarized components. The following description will focus on differences from the configuration according to the first embodiment.

A plurality of signal light sources 901 (LD1 to LD16) output continuous wave light (CW light) with wavelengths that differ from a local oscillation light source 908, and an output light of each signal light source is subjected to QPSK modulation using a corresponding external modulator 902. Each modulated light is multiplexed by AWG 903. These elements constitute a signal light generator. Fundamental wave excitation light 961 branched by an optical branch 915 outputs pilot light 971 of which polarization has been tilted by 45 degrees by the polarization controller 924. A main signal light group from the AWG 903 and the pilot light 971 are multiplexed by the optical branch 925 and a polarization-multiplexed main signal group 950 is obtained. In this case, on a frequency (wavelength) axis, the main signal group 950 appears to be constituted by a main signal group 960 and pilot light 967.

A configuration of a looped phase conjugate light generator which is unique to the optical transmitter according to the present invention is the same as in the first embodiment. In order to generate phase conjugate light, a shared single second-order non-linear optical element 906 is bidirectionally used by adopting a looped configuration for an optical path. By independently performing optical sensitive amplification with respect to two polarized components with opposite propagation directions and subsequently once again multiplexing the two polarized components with a PBS 905, a PDM signal 955 constituted by a pair of a polarization-multiplexed main signal light group 968 and a phase conjugate light group 970 thereof and pilot light 969 is generated.

In a similar manner to the two embodiments described above, in the optical transmitter 900, generation of each phase conjugate light with respect to the two polarized waves is performed by a single component in an optical path of a looped configuration with the sole exception of propagation directions being mutually reverse. Therefore, optical paths and components can be made completely equal with respect to the two polarized components. Even if various environmental variations or external actions which may cause a fluctuation in a relative phase between the two polarized components are created with respect to the optical paths, such an environmental variation or an external action is to be simultaneously and equally applied to the two polarized components. Therefore, a variation in phase that occurs in the case of conventional art in which polarization separation is performed by two signal arms is reduced to an ignorable degree. In addition, bidirectionally using a shared single second-order non-linear optical element 706 by adopting a looped configuration for an optical path enables the number of parts to be reduced.

While an operation of the second-order non-linear optical element 906 for DFG is similar to that in the case of the first and second embodiments, TM polarized signal light 751 and TE polarized signal light 753 include pilot light. Since a frequency of beams of SH excitation light 962 and 963 from a second-order non-linear optical element 911 for SHG is twice a frequency of the pilot light, the pilot light is amplified by degenerate phase sensitive amplification by the second-order non-linear optical element 906. With respect to TE polarized signal light 953, using a dichroic mirror on a left side of the second-order non-linear optical element 906, a signal light group constituted by a pair of the signal light and phase conjugate light thereof and pilot light are separated from the SH excitation light and TM polarized signal light 955 of the signal light group and the pilot light is output. In addition, with respect to TM polarized signal light 951, using a dichroic mirror on a right side of the second-order non-linear optical element 906, a signal light group constituted by a pair of the signal light and phase conjugate light thereof and pilot light are separated from the SH excitation light and, after polarization conversion, TE polarized signal light 952 of the signal light group and the pilot light is output.

With respect to each of two polarized waves, optical branches 916 and 920 which partially branch output of each polarized component of which phase conjugate light has been generated is provided on an output side of the second-order non-linear optical element 906 for DFG. In other words, with respect to the TM polarized signal light 951 input counter-clockwise to the loop, a part of the signal light is branched by the optical branch 916, only the pilot light is further extracted by a BPF 926, and a change in light intensity of the pilot light is detected by a photodetector 917. The detected electric signal of the pilot light is supplied to a PLL circuit 918 and the PLL circuit 918 performs feedback to a fiber expander/contractor 919 so as to maximize output of the pilot light. In a similar manner, with respect to the TE polarized signal light 953 input clockwise to the loop, a part of the signal light is branched by the optical branch 920, only the pilot light is further extracted by a BPF 927, and a change in light intensity of the pilot light is detected by a photodetector 921. The detected electric signal of the pilot light is supplied to a PLL circuit 922 and the PLL circuit 922 performs feedback to a fiber expander/contractor 923 so as to maximize output of the pilot light.

In the optical transmitter 900 according to the present embodiment, two phases adjusting mechanisms corresponding to propagation directions of a signal light group in an optical waveguide inside the second-order non-linear optical element 906 operate independently. Focusing on a control object to be adjusted by a feedback operation, a phase of SH excitation light is controlled and adjusted by a fiber expander/contractor in the first embodiment while a phase of fundamental wave excitation light is controlled and adjusted by a fiber expander/contractor in the second embodiment. In contrast, in the optical transmitter according to the present embodiment, a feedback operation is performed for each of two polarized components with respect to a signal group constituted by a pair of each main signal and phase conjugate light and pilot light. Due to the two phases adjusting mechanisms, a variation and a phase drift of a relative phase between two polarized waves are compensated by an optical fiber expander/contractor at the same time as phase adjustment of excitation light and signal light.

Figure 9:
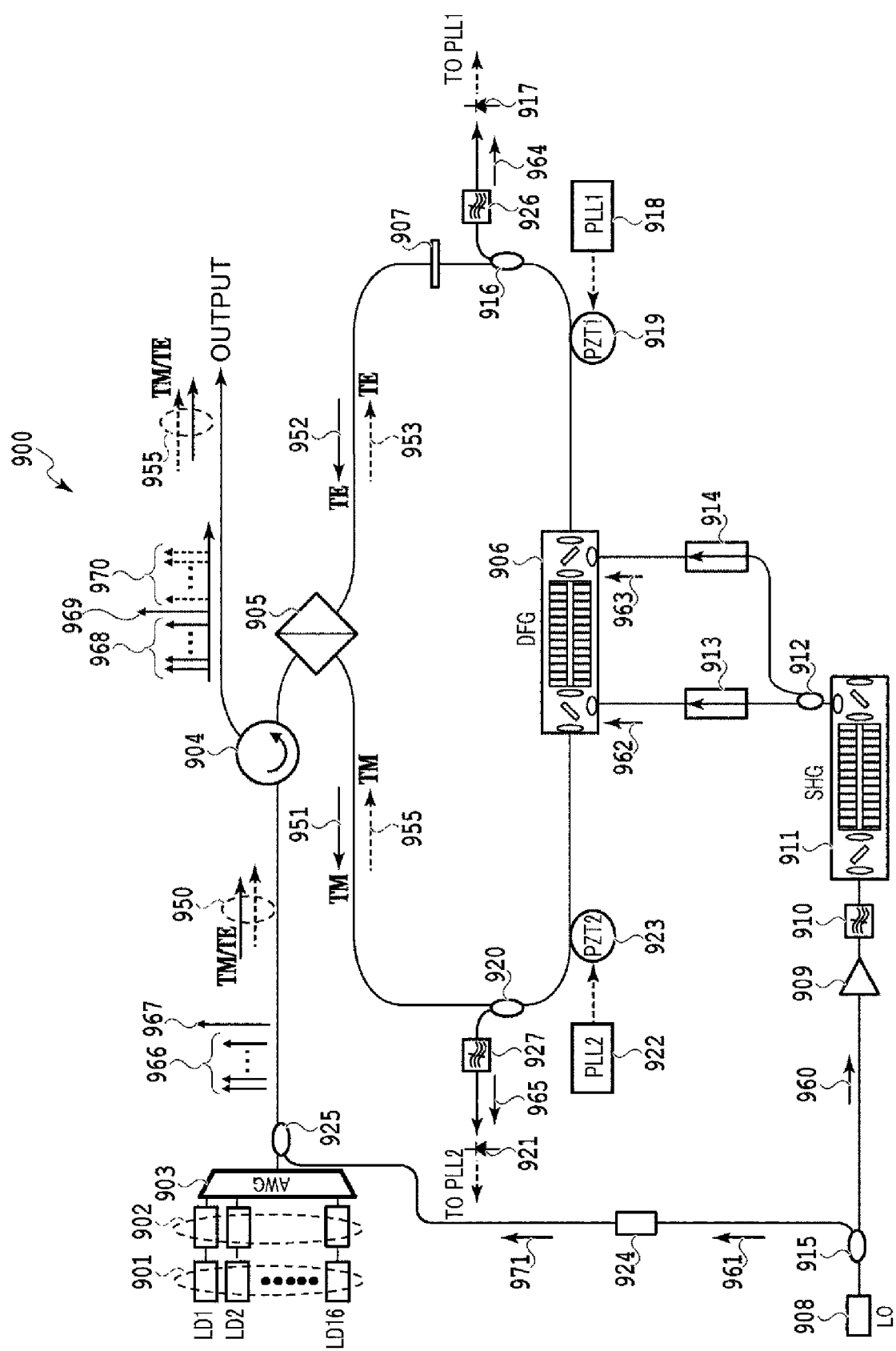
FIG. 9 is a diagram showing a configuration of an optical transmitter according to a third embodiment.

In the configuration shown in FIG. 9, a feedback circuit including the optical branch 916, the BPF 926, the photodetector 917, the PLL circuit 918, and the fiber expander/contractor 919 constitutes a first phase adjusting mechanism with respect to the counter-clockwise TM polarized signal light 951. In addition, a feedback circuit including the optical branch 920, the BPF 927, the photodetector 917, the PLL circuit 922, and the fiber expander/contractor 923 constitutes a second phase adjusting mechanism with respect to the clockwise TE polarized signal light 953. In feedback operations of both phase regulating mechanisms, a detected object is a level of pilot light. Therefore, a state where phases of two beams of pilot light are always locked can be maintained between the TE polarized component and the TM polarized component. A reference phase of the main signal light and phase conjugate light thereof which is generated by the second-order non-linear optical element 906 is determined by a phase of SH excitation light.

Figure 1:
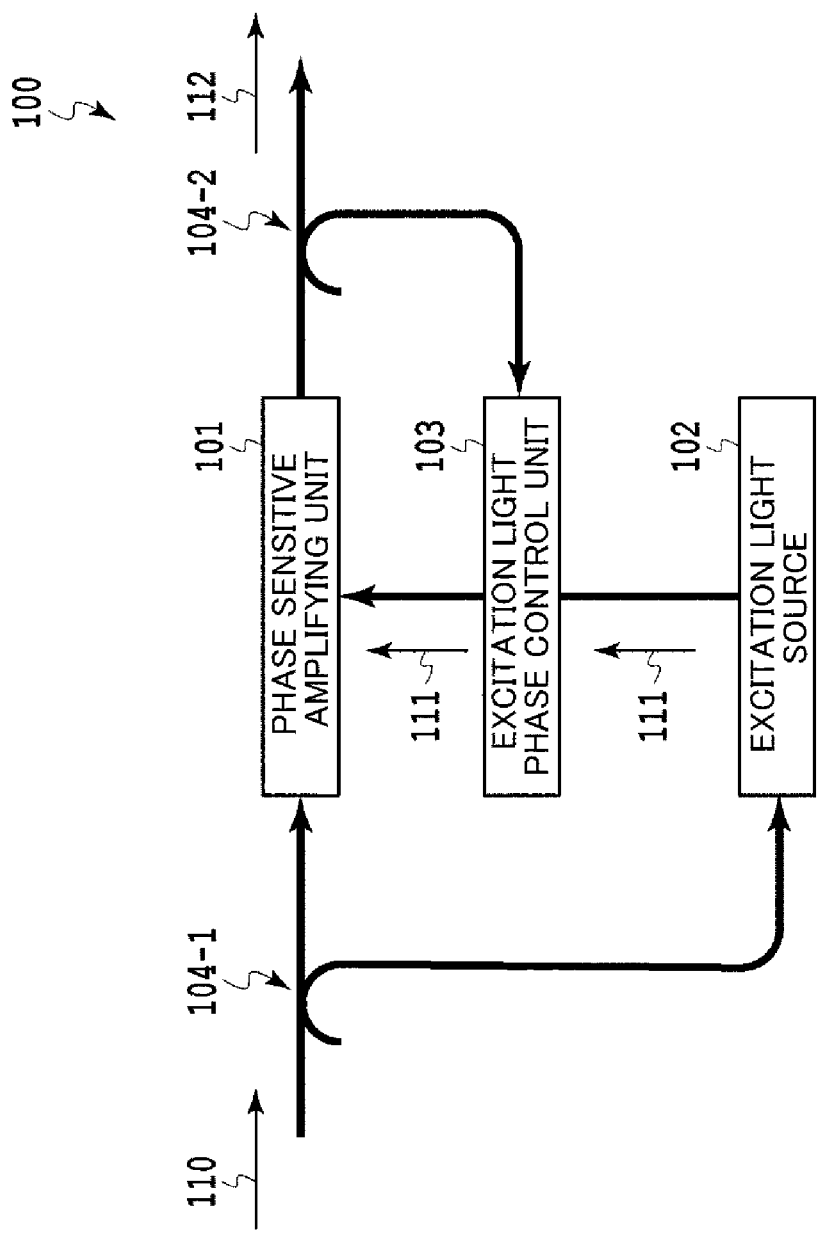
FIG. 1 is a diagram showing a basic configuration of a PSA according to conventional art.
Figure 2:
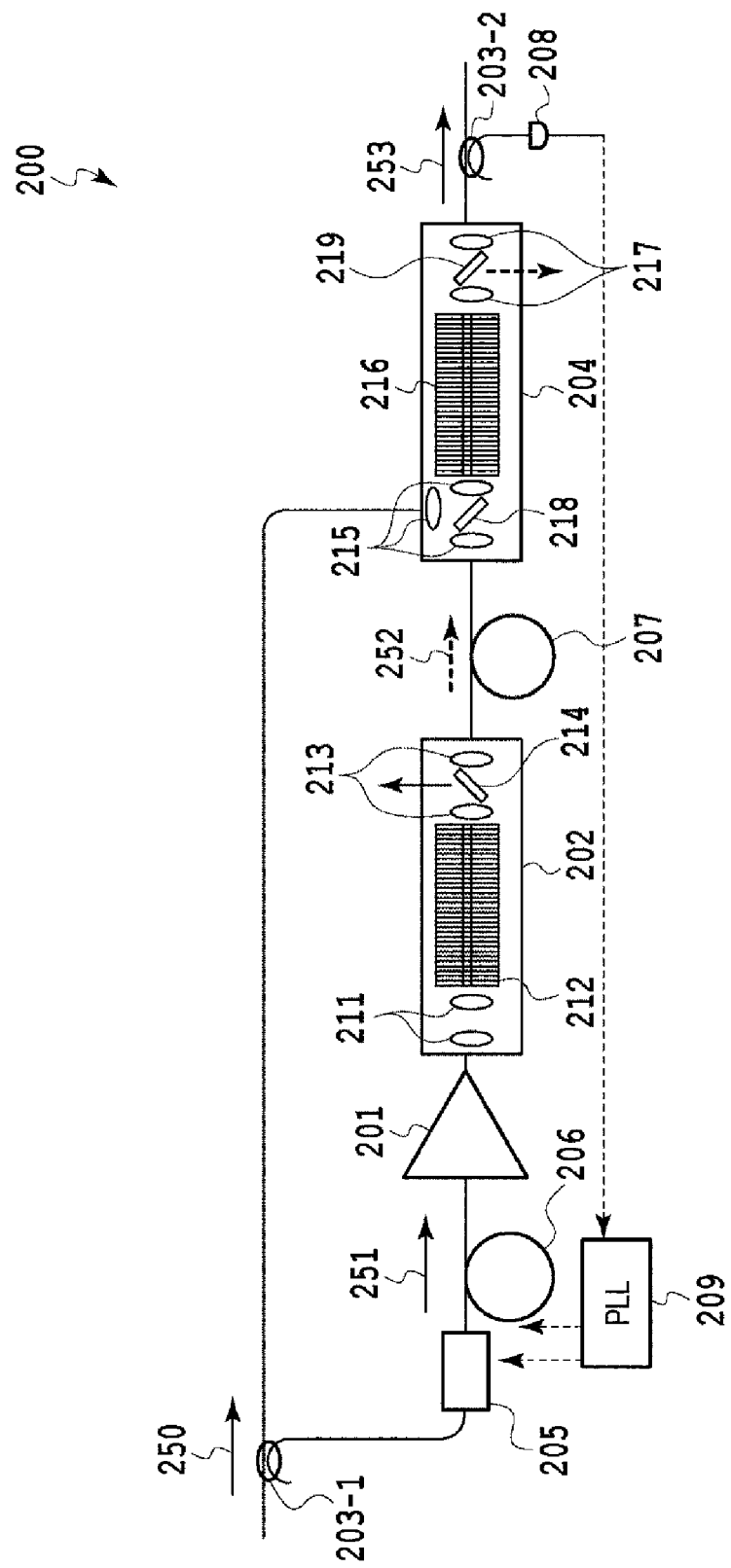
FIG. 2 is a diagram showing a configuration of a PSA according to conventional art which uses a PPLN waveguide.
Figure 3:
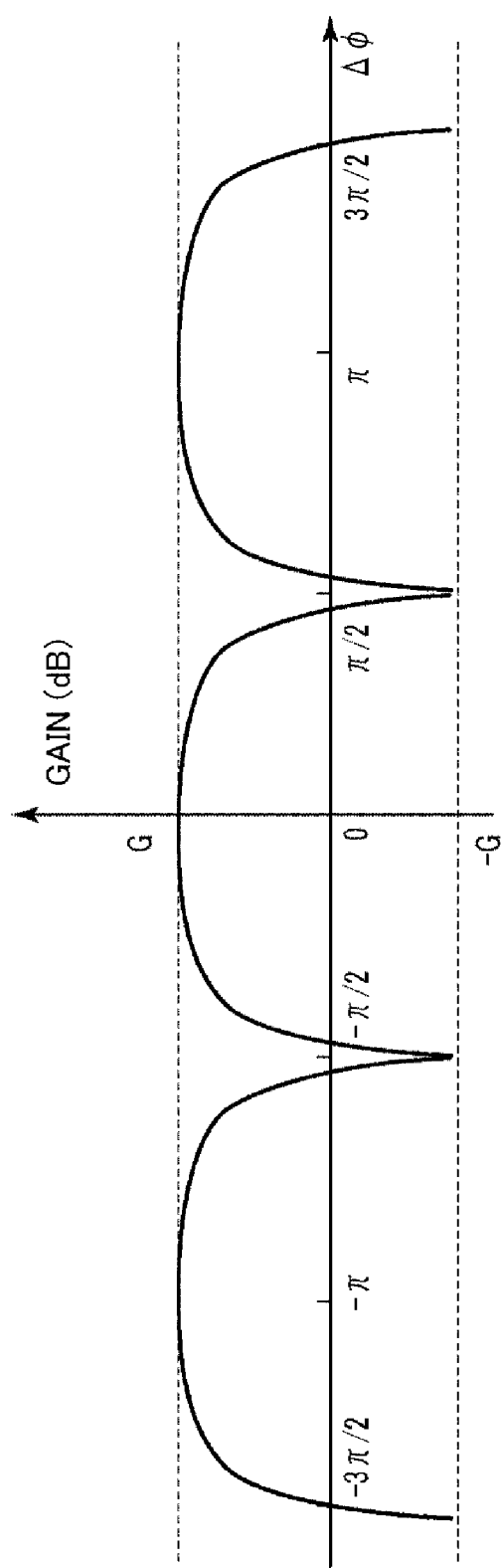
FIG. 3 is a diagram showing a relationship between a phase difference and gain between PSA input signal light and excitation light.
Figure 4:
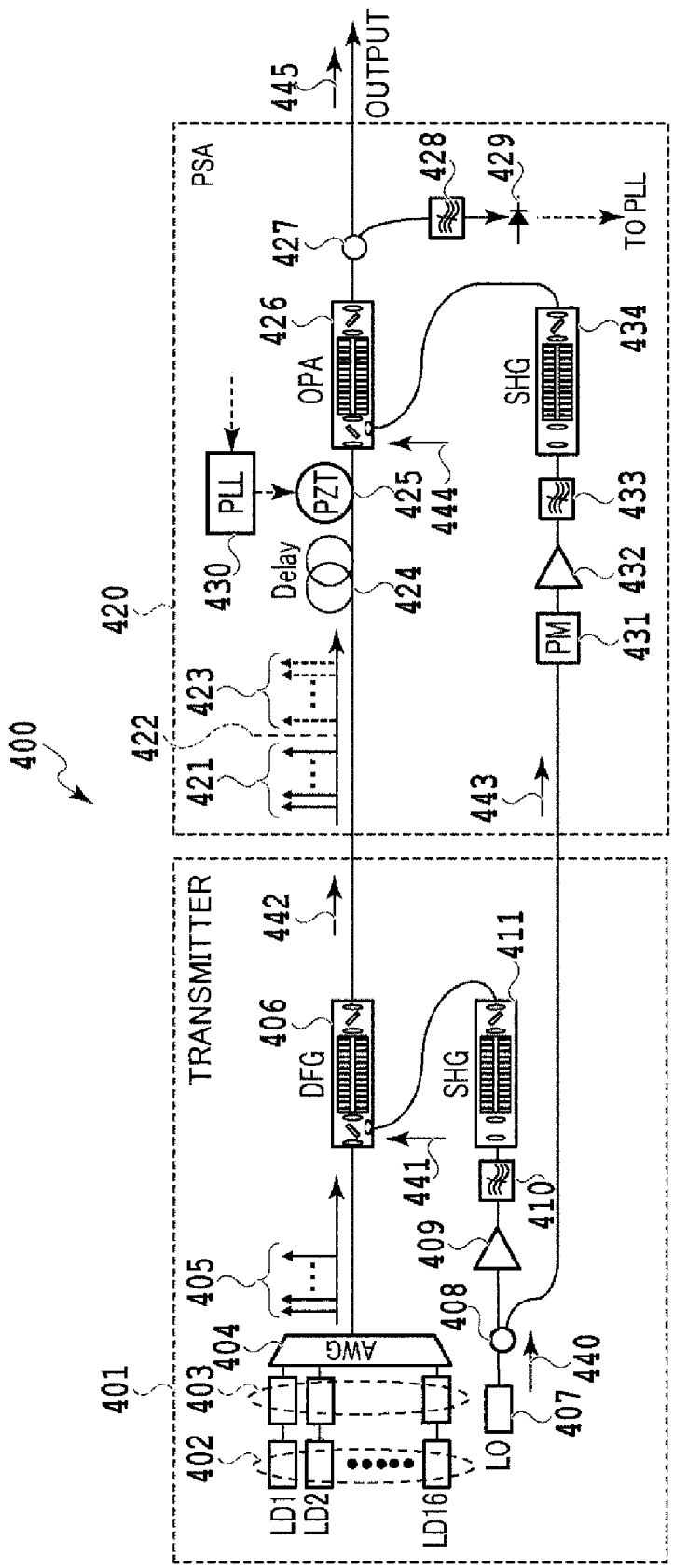
FIG. 4 is a diagram showing a non-degenerate PSA configuration according to conventional art which uses a signal light pair.
Figure 5:
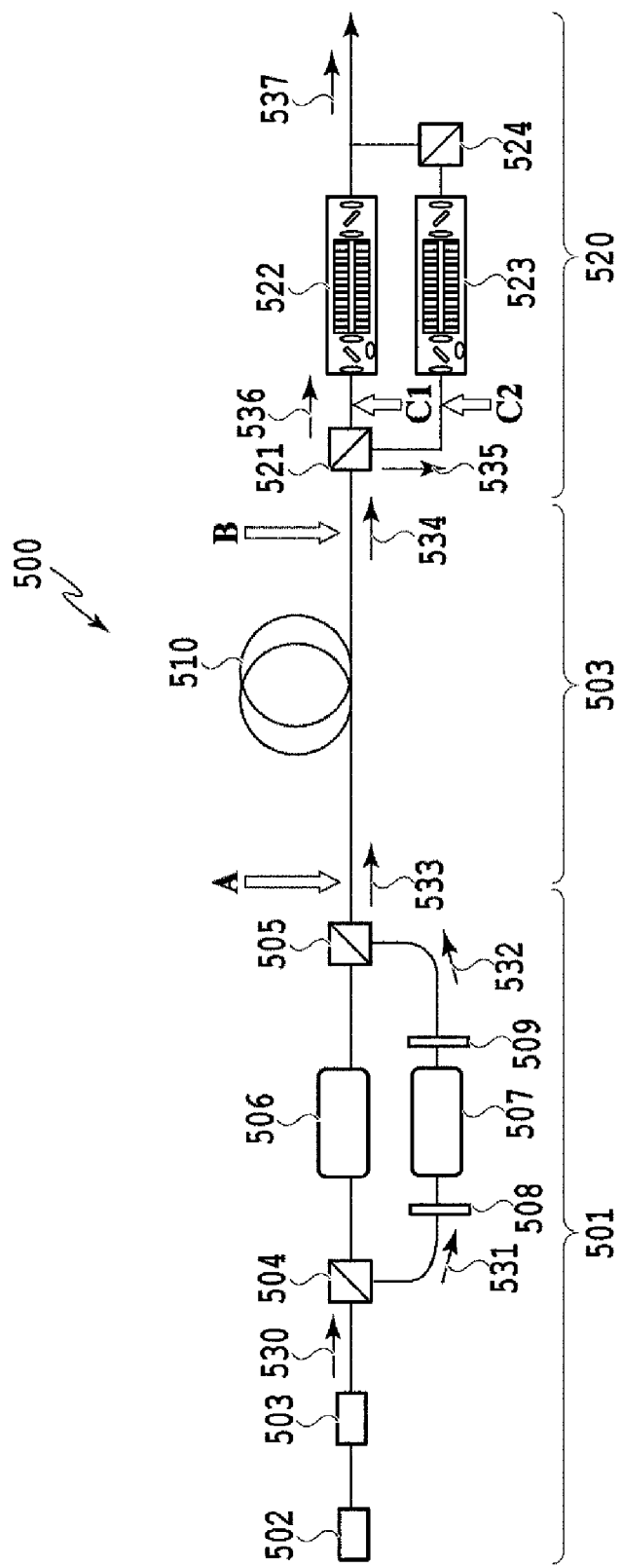
FIG. 5 is a diagram showing an optical transmission system of polarization-multiplexed signals according to conventional art.
Figure 6:
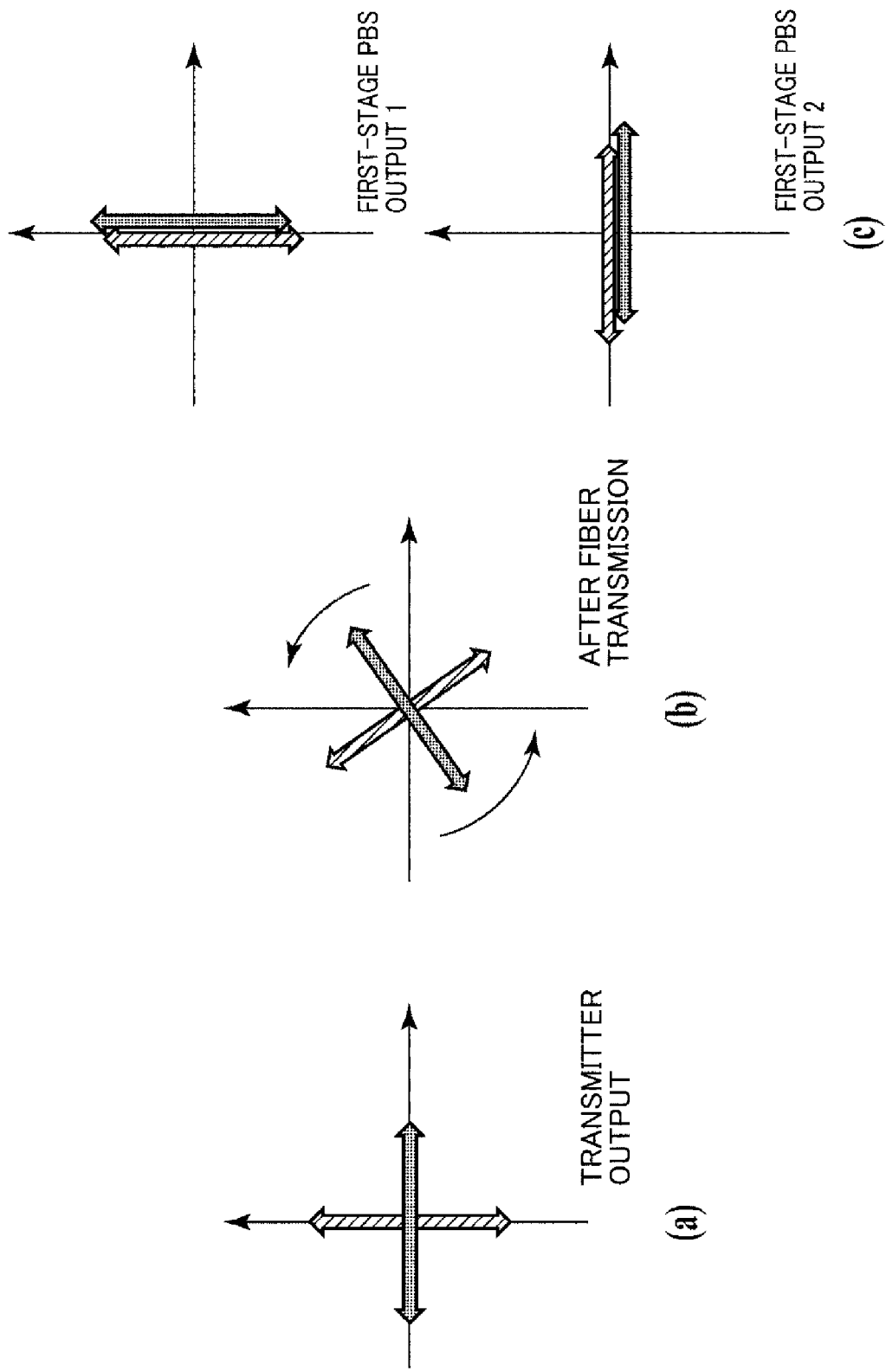
FIG. 6 is a diagram illustrating a polarization state of each part of a PDM optical transmission system.

When performing non-degenerate phase sensitive amplification including the polarization diversity configuration 520 shown in FIG. 5, a phase of SH excitation light used by a phase sensitive amplifier must be matched with the reference phase of the main signal light and the phase conjugate light. As a prerequisite thereof, when generating signal light having been polarization-multiplexed by the side of the optical transmitter 501 and the phase conjugate light thereof, the reference phase must also be locked between the two polarized waves. In the optical transmitter 900 according to the present embodiment, maintaining a state where phases of the two beams of pilot light are always locked between two polarized waves means that SH excitation light phases are locked between the two polarized waves. When the first phase adjusting mechanism operates in a state where SH excitation light 926 corresponding to the counter-clockwise TM polarized signal light 951 is constant, a phase of the SH excitation light 926 and a reference phase are to be locked with respect to the TM polarized signal light 951. In a similar manner, when the second phase adjusting mechanism operates in a state where SH excitation light 922 corresponding to the clockwise TE polarized signal light 953 is constant, a phase of the SH excitation light 922 and a reference phase are to be locked with respect to the TE polarized signal light 953. Therefore, a condition for performing phase sensitive amplification is to be simultaneously satisfied with respect to two polarized waves by the two phases adjusting mechanisms. Since adopting the configuration of the optical transmitter 900 shown in FIG. 9 enables a polarization-multiplexed signal to be transmitted in a state where a reference phase between two quadrature polarized waves is locked, a phase sensitive amplifier with polarization diversity can be operated in a stable manner in a repeater.

A phase conjugate light generator with a looped configuration according to the present embodiment enables an optical wave obtained by polarization-multiplexing a signal light group constituted by main signal light and phase conjugate light thereof to be transmitted in a state where a relative phase between polarized waves is stabilized. Since the relative phase between two polarized waves and a reference phase of the signal light and the phase conjugate light thereof are stabilized, a phase sensitive amplifier with a polarization diversity configuration can be operated in a stable manner even in a repeater.

While the optical transmitter according to the present embodiment has been described as an example using a QPSK signal, any format with a higher degree of levels such as IMDD, BPSK, QPSK, 64 QAM, or 256 QAM may be used as a modulation format. Regardless of the format, polarization-multiplexed and modulated signal light can be generated by exactly the same configuration as the phase conjugate light generator with a looped configuration described in the present embodiment. Using the optical transmitter according to the present embodiment, a modulated signal with a multilevel modulation format which stabilizes a phase state and which causes a polarization diversity configuration to be operated in a stable manner can be transmitted.

In addition, in the phase conjugate light generator in the optical transmitters according to the respective examples described above, an example of generating phase conjugate light with respect to TM polarized signal light has been shown as a single second-order non-linear optical element for DFG. However, with a second-order non-linear optical element capable of generating phase conjugate light with respect to TE polarized signal light, a position of a polarization rotator in a loop need only be changed from a position on a right side of the second-order non-linear optical element to a position on a left side as shown in FIGS. 7 to 9. Note that operations can be performed in a similar manner to the embodiments described above.

In addition, while a second-order non-linear optical element for SHG is used to create excitation light in the optical transmitters according to the respective examples described above, a configuration of a second-order non-linear optical element is not necessarily limited to the configuration shown in FIGS. 7 to 9 as long as prescribed SH excitation light can be supplied. However, since a second-order non-linear optical element for DFG is used to generate phase conjugate light, it is rational to use a second-order non-linear optical element for SHG to generate SH excitation light.

As described in detail above, the present invention can provide an optical transmitter that generates a PDM signal in which a variation in a phase between quadrature polarized waves is suppressed. By stabilizing quality of a PDM transmission signal on a side of the optical transmitter, a phase sensitive amplifier in a polarization diversity configuration can be operated in a stable manner.

INDUSTRIAL APPLICABILITY

The present invention can be generally used in communication systems. In particular, the present invention can be used in optical transmitters of optical communication systems.

REFERENCE SIGNS LIST 100, 200 PSA
201, 409, 432, 709, 809a, 809b, 909 EDFA
202, 204, 406, 411, 436, 434, 706, 806, 811, 812, 906, 911 Second-order non-linear optical element
203-1, 203-2, 408, 427, 712, 715, 716, 717, 815, 816, 817, 915, 916, 920, 925 Optical branch
206, 425, 720, 820, 919, 923 PZT
209, 430, 719, 819, 918, 922 PLL circuit
401, 501, 700, 800, 900 Optical transmitter
402, 701, 801, 901 Signal light source
403, 702, 802, 902 Modulator
404, 703, 803, 903 AWG
407, 708, 808, 908 Local oscillation light source (LO)
410, 428, 433, 710, 810a, 810b, 910, 926, 927 BPF
420 Phase sensitive amplifier
504, 505, 521, 524, 705, 805, 905 PBS
704, 804, 904 Circulator 508, 509, 707, 807, 907 Polarization rotator
521 Polarization diversity configuration
713, 714, 813, 814, 813, 914 Isolator
924 Polarization controller

The invention claimed is:

1. An optical transmitter which generates signal light and phase conjugate light thereof, the optical transmitter comprising:
a polarization separator to which polarization-multiplexed and modulated signal light is input and which polarization-separates signal light of a first polarized component and signal light of a second polarized component that is orthogonal to the first polarized component and outputs the signal light of the polarized components to two output ports;
a loop-type phase conjugate light generator having, on a path from one to another of the two output ports, the polarization separator,
a polarization rotator which rotates by 90 degrees a polarized wave of the signal light of the first polarized component, and
a first second-order non-linear optical element equipped with a first optical waveguide that generates phase conjugate light of the polarization-rotated signal light and phase conjugate light of the signal light of the second polarized component;
an excitation light generator which supplies first excitation light that generates the phase conjugate light of the polarization-rotated signal light to one end of the first optical waveguide on a side where the polarization rotator is present and supplies second excitation light that generates the phase conjugate light of the second polarized component to the other end of the first optical waveguide; and
a phase adjuster configured to change an optical path length of one of a path of the first excitation light and a path of the second excitation light in accordance with a combined level of the first excitation light and the second excitation light after generating the phase conjugate light.

2. The optical transmitter according to claim 1, wherein the excitation light generator generates second harmonic light (SH light) from fundamental wave light, branches the SH light, and generates first SH excitation light that is the first excitation light and second SH excitation light that is the second excitation light, and
the phase adjuster changes an optical path length of one of a path of the first SH excitation light and a path of the second SH excitation light.

3. The optical transmitter according to claim 1, wherein the excitation light generator branches fundamental wave light and, based on the branched fundamental wave light, generates first second harmonic (SH) excitation light that is the first excitation light and second SH excitation light that is the second excitation light, and
the phase adjuster changes an optical path length of any of paths of the branched fundamental wave light.

4. An optical transmitter which generates signal light including pilot light and phase conjugate light thereof, the optical transmitter comprising:
a polarization separator which polarization-separates pilot light and polarization-multiplexed and modulated signal light into signal light of a first polarized component and signal light of a second polarized component that is orthogonal to the first polarized component and outputs the signal light of the polarized components to two output ports;
a loop-type phase conjugate light generator having, on a path from one to another of the two output ports, the polarization separator,
a polarization rotator which rotates by 90 degrees a polarized wave of the signal light of the first polarized component, and
a first second-order non-linear optical element equipped with a first optical waveguide that generates phase conjugate light of the polarization-rotated signal light and phase conjugate light of the signal light of the second polarized component and performs degenerate parametric amplification in each of two directly opposite propagation directions with respect to the polarization-separated pilot light;
an excitation light generator which supplies first excitation light that generates the phase conjugate light of the polarization-rotated signal light to one end of the first optical waveguide on a side where the polarization rotator is present and supplies second excitation light that generates the phase conjugate light of the second polarized component to the other end of the first optical waveguide; and
a phase adjuster configured to change an optical path length of a path of the pilot light in accordance with a level of the pilot light subjected to degenerate parametric amplification in a first direction among the two propagation directions and to change an optical path length of a path of the pilot light in accordance with a level of the pilot light subjected to degenerate parametric amplification in a second direction among the two propagation directions.

5. The optical transmitter according to claim 4, wherein the excitation light generator generates second harmonic light (SH light) from fundamental wave light, branches the SH light, and generates first SH excitation light that is the first excitation light and second SH excitation light that is the second excitation light, and
the pilot light is based on a part of the fundamental wave light.

6. The optical transmitter according to claim 2, wherein the excitation light generator includes one or more second second-order non-linear optical elements equipped with a second optical waveguide which generates the SH light from the fundamental wave light and generates the first SH excitation light and the second SH excitation light.

7. The optical transmitter according to claim 1, further comprising
a signal light generator which includes a plurality of light sources which output continuous wave light (CW light), and
an external modulator which applies modulation to both polarized waves of the CW light from each of the plurality of light sources, and which generates polarization-multiplexed and modulated signal light.

8. The optical transmitter according to claim 1, wherein the optical waveguide included in the second-order non-linear optical element is a directly-bonded ridge waveguide, and the directly-bonded ridge waveguide can be constructed from any material of $LiNbO_3$, $KNbO_3$, $LiTaO_3$, $LiNb_{(x)}Ta_{(1-x)}O_3$ ($0 \leq x \leq 1$), and $KTiOPO_4$, or a material obtained by adding at least one material selected from a group consisting of Mg, Zn, Sc, and In as an additive to any of these materials.

9. The optical transmitter according to claim 3, wherein the excitation light generator includes one or more second second-order non-linear optical elements equipped with a second optical waveguide which generates the SH light from the fundamental wave light and generates the first SH excitation light and the second SH excitation light.

10. The optical transmitter according to claim 5, wherein the excitation light generator includes one or more second second-order non-linear optical elements equipped with a second optical waveguide which generates the SH light from the fundamental wave light and generates the first SH excitation light and the second SH excitation light.

11. The optical transmitter according to claim 4, further comprising
a signal light generator which includes a plurality of light sources which output continuous wave light (CW light), and
an external modulator which applies modulation to both polarized waves of the CW light from each of the plurality of light sources, and which generates polarization-multiplexed and modulated signal light.

12. The optical transmitter according to claim 4, wherein the optical waveguide included in the second-order non-linear optical element is a directly-bonded ridge waveguide, and the directly-bonded ridge waveguide can be constructed from any material of $LiNbO_3$, $KNbO_3$, $LiTaO_3$, $LiNb_{(x)}Ta_{(1-x)}O_3$ ($0 \leq x \leq 1$), and $KTiOPO_4$, or a material obtained by adding at least one material selected from a group consisting of Mg, Zn, Sc, and In as an additive to any of these materials.

* * * * *